United States Patent [19]

Talbot et al.

[11] Patent Number: 5,459,986
[45] Date of Patent: Oct. 24, 1995

[54] DRAPER HEADER WITH CANVAS TO CUTTER BAR SEAL

[75] Inventors: Francois Talbot; Thomas R. Fox, both of Winnipeg, Canada

[73] Assignee: MacDon Industries Ltd., Winnipeg, Canada

[21] Appl. No.: 363,944

[22] Filed: Dec. 27, 1994

[51] Int. Cl.$^6$ ............ A01D 34/12; A01D 34/40; A01D 47/00; A01D 57/20

[52] U.S. Cl. ............ 56/181; 56/14.5; 56/DIG. 17

[58] Field of Search ............ 56/14.4, 14.5, 56/181, 178, 179, 162, 158, DIG. 17

[56] References Cited

U.S. PATENT DOCUMENTS

| | | | |
|---|---|---|---|
| 923,084 | 5/1909 | Simmons | 56/181 |
| 1,580,646 | 4/1926 | Brattly | 56/181 |
| 2,235,602 | 3/1941 | Biesemeyer | 56/181 |
| 2,720,743 | 10/1955 | Prather | 56/181 X |
| 2,795,922 | 6/1957 | Hume | 56/181 X |
| 4,938,010 | 7/1990 | Guinn et al. | 56/181 |
| 4,956,966 | 9/1990 | Patterson | 56/181 |
| 5,005,343 | 4/1991 | Patterson | 56/181 X |

OTHER PUBLICATIONS

P. 73, Operator's Manual of John Deere Header Model 800.

Primary Examiner—Stephen J. Novosad
Attorney, Agent, or Firm—Adrian D. Battison; Murray E. Thrift

[57] ABSTRACT

A header includes a cutter bar with a generally C-shaped beam supporting the sickle knife assembly across a front edge of the assembly. A draper assembly is carried on the cutter bar beam and includes a pair of rollers at right angles to the beam carrying a continuous draper canvas band around the rollers with the front edge of the canvas adjacent the cutter bar beam. The rollers and a support plate between the rollers for the upper run of the canvas are both recessed relative to the front edge of the canvas to leave a cantilever portion at the front edge of the canvas. This cantilever portion has an upper surface engaging an undersurface of a top plate of the beam to provide a seal inhibiting penetration of materials between the canvas and the cutter bar. A lower plate of the C-shaped beam is shorter in length than the upper plate and is inclined downwardly to allow the discharge of any materials from the area between the draper canvas and the cutter bar to prevent buildup.

8 Claims, 3 Drawing Sheets

DRAPER HEADER WITH CANVAS TO CUTTER BAR SEAL

This invention relates to a header for cutting and transporting a standing crop and particularly to an arrangement which provides a seal between a front edge of a draper canvas of the header and a rear edge of a cutter bar of the header to inhibit entry therebetween of materials carried by the cut crop.

BACKGROUND OF THE INVENTION

Draper headers generally include a header frame, an elongate cutter bar along a front edge of the frame including a cutter bar beam which carries a plurality of knife guards for guiding reciprocating movement of a sickle knife across a front edge of the cutter bar. On the header is also mounted a draper assembly including a first and second draper guide roller each arranged at a respective end of the draper assembly spaced apart along the cutter bar with an axis of each roller extending substantially at right angles to the cutter bar, a draper canvas forming a continuous loop of flexible material wrapped around the rollers so as to define a front edge of the canvas adjacent the cutter bar, a rear edge of the canvas spaced rearwardly of the cutter bar, an upper run of the canvas on top of the roller and a lower run of the canvas below the rollers. The cut crop thus falls rearwardly onto the upper run of the canvas and is transported longitudinally of the header. It is necessary in between the draper rollers to provide a support plate assembly for the upper run of the draper canvas to prevent sagging. This support plate assembly includes a front support plate arranged underneath the front edge of the upper run of the draper canvas and projecting forwardly therefrom for engagement with and support by the cutter bar.

The header of this type can be used simply for forming a swath in which case the material is carried to a discharge opening of the header and deposited therefrom onto the ground. Headers of this type can also be used for feeding a combine harvester so that the materials are carried to an adapter member positioned at the discharge opening of the header for carrying the materials from the discharge opening into the feeder housing of the combine harvester. Yet further, headers of this type can be used for hay conditioners in which the material from the discharge opening is carried into crushing rolls. It will be appreciated, therefore, that the use of the header is not limited to particular types of agricultural machine but can be used with any such machine in which it is necessary to cut a standing crop and to transport that crop when cut longitudinally of the header for operation thereon.

The draper canvas normally comprises a fabric which is coated with a rubber material which is then vulcanized after forming of the fabric into the required shape and after attachment thereto of transverse slats.

One problem which arises with this combination of cutter bar and draper is that of the penetration between the draper and the cutter bar of materials including hay juices, mud and other particles carried by the cut crop. Such materials in the absence of any sealing effect enter the space between the drapers and form a very hard substance that sticks to the draper support plate and the rollers and can interfere with the proper operation of these elements, in some cases leading to damage.

Attempts have therefore been made to provide a seal between the front edge of the upper run of the draper canvas and the rear edge of the cutter bar. Up till now, however, these attempts have not achieved a complete solution to the problem.

One previous proposal made by John Deere approximately 25 years ago and is shown in the Operator's Manual of their Model 800 header on page 73. This arrangement provides an additional sealing plate mounted on the cutter bar and extending therefrom rearwardly over the upper surface of the draper, the plate having a downwardly depending edge guide for contacting an upper surface of the draper canvas at a position adjacent the edge of the canvas. This plate had some flexibility relative to the cutter bar so that it could accommodate buildup of materials but the sealing effect was thus reduced. The sealing plate, according to the Manual, was intended for use only with selection of a narrow draper canvas from the choice of the alternative wide and narrow canvases. The use of the narrow canvas provided a cooperation between the edge of the canvas and the rear edge of the cutter bar which was shaped to allow an escape opening between a bottom surface of the cutter bar and the lower run of the draper canvas so that any materials collecting in that area could escape underneath the lower run of the draper canvas to fall to the ground. The draper guide rollers were longer than the width of the canvas so that they projected out from the canvas edges and therefor could become wrapped with the crop material, which of course cannot be tolerated. The support plate for the edge of the canvas was adjusted so that it underlay the edge of the canvas. The canvas edge was thus pinched between the guide edge of the plate and the top surface of the support plate and of the guide rollers.

This arrangement provided a seal which reduced the penetration of the materials into the area between the cutter bar and the draper. However in some cases the crop juices, soil particles and other moisture could cause a buildup of materials in the area between the sealing plate mounted on the cutter bar and the support plate. In some cases these built up materials would be sufficient to trap the edge of the draper canvas to an extent where the edge is damaged. This potential for damage reduced the acceptability of this design which is believed now to have been abandoned.

SUMMARY OF THE INVENTION

It is one object of the present invention, therefore, to provide an improved header including a modified construction of the cooperation between the draper and the cutter bar which allows a more effective seal to be provided between the front edge of the upper run of the draper canvas and the rear edge of the cutter bar to inhibit the penetration of materials carried by the cut crop.

According to one aspect of the invention there is provided a header for cutting and transporting a standing crop comprising a header frame, an elongate cutter bar arranged along a front edge of the frame and including a plurality of knife guards at spaced positions therealong and a sickle knife reciprocable longitudinally thereof within the knife guards for cutting the standing crop and a draper assembly mounted on the header frame rearwardly of the cutter bar such that crop cut by the cutter bar falls onto the draper assembly for transportation longitudinally of the header, the draper assembly including a first and a second draper guide roller each arranged at a respective end of the draper assembly spaced apart along the cutter bar with an axis of each guide roller arranged substantially at right angles to the cutter bar, a draper canvas forming a continuous loop of flexible material wrapped around the rollers so as to define an upper run of the canvas on top of the rollers and a lower run of the canvas below the rollers, a front edge of the upper run of the canvas adjacent the cutter bar, and a rear edge of the upper run of the canvas spaced rearwardly of the cutter bar, and a front draper support plate defining a substantially horizontal support surface lying under the upper run adjacent the front edge thereof and extending therealong between the first and second guide rollers, the first and second guide rollers each having a front end thereof recessed rearwardly of the front edge of the upper run of the draper canvas and the support plate having a front edge thereof recessed rearwardly of the front edge of the upper run of the draper canvas such that the upper run of the draper canvas includes a portion thereof at the front edge which is cantilevered forwardly of the rollers and of the support plate, the cutter bar including an element thereof extending rearwardly over the upper run of the draper canvas to a position rearwardly of the front edge of the upper run of the draper canvas and forwardly of the front end of the rollers and of the front edge of the support plate and engaging said portion of the draper canvas for forming a seal therewith to inhibit entry between the cutter bar and the draper canvas of materials carried by the cut crop.

The use of the rollers which are of a length less than the width of the canvas ensures that the rollers and their tensioning and adjustment support elements are received within the canvas and hence are not exposed for wrapping by the crop material.

The recessing of the support plate from the edge of the canvas ensures that the edge of the canvas is not confined between two support elements above and below the edge and thus avoids any possibility of damage occurring by pinching of the edge.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Only those parts of the header which are of importance to the present invention are shown in the above figures of the present application and the remaining parts of the header including the frame structure, drives, ground wheels and the like are omitted as these will be well known to one skilled in the art. The present invention is concerned with the area of cooperation between the front edge of the draper and the cutter bar and therefore these elements only are shown in detail.

The header therefore comprises a frame, one element of which is indicated at 10 in the form of a beam extending horizontally forwardly from a rear support frame structure (not shown) to a cutter bar assembly generally indicated at 11 for support of that cutter bar assembly. The beam 10 forms one of a plurality of such beams arranged at spaced positions along the length of the header frame so as to support the cutter bar assembly 11 as an elongate structure across the front edge of the header.

Figure 1:
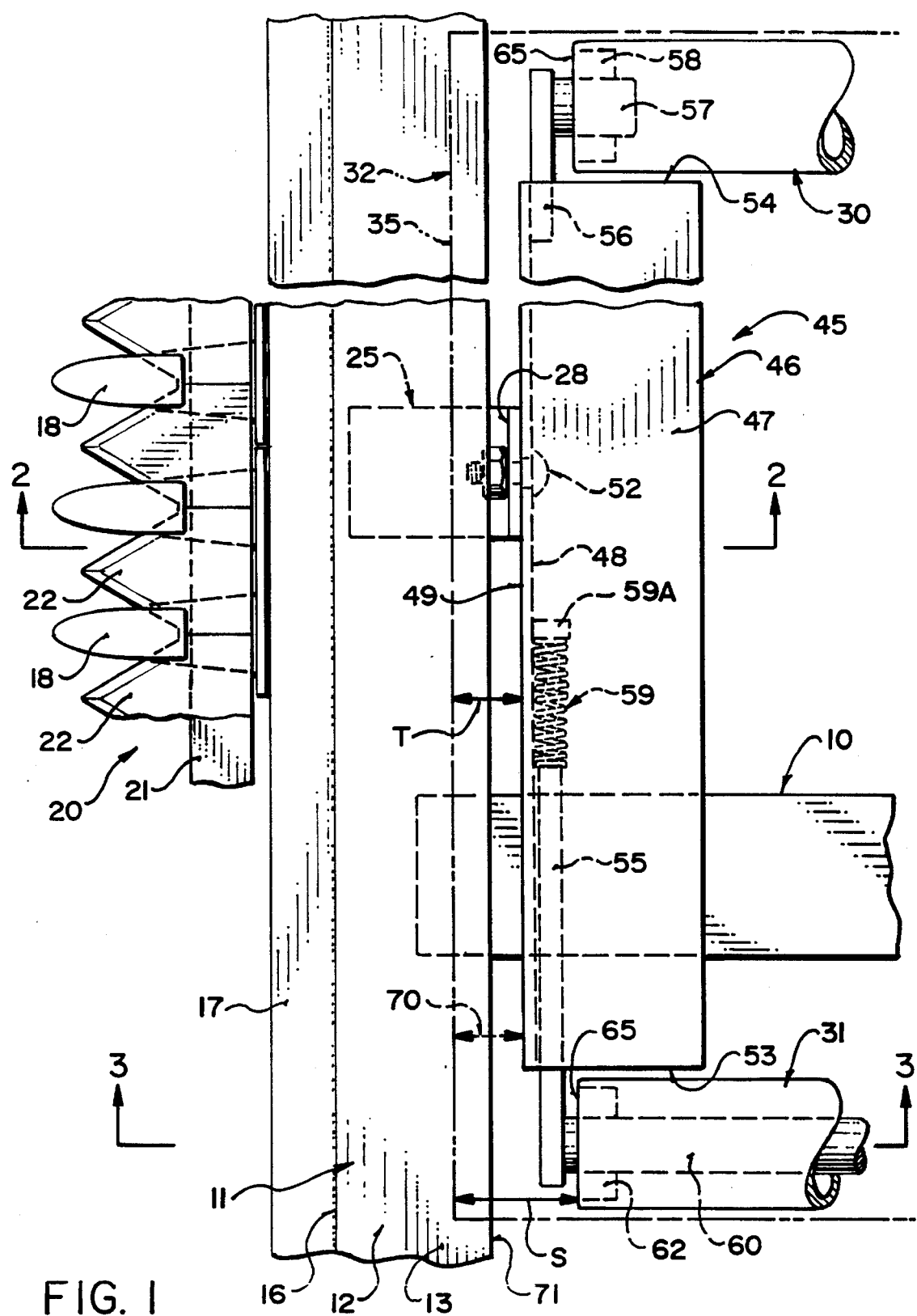
FIG. 1 is a top plan view of the front part of a header with the draper canvas removed to show the underlying elements, the position of the draper canvas being shown in dash line.
Figure 2:
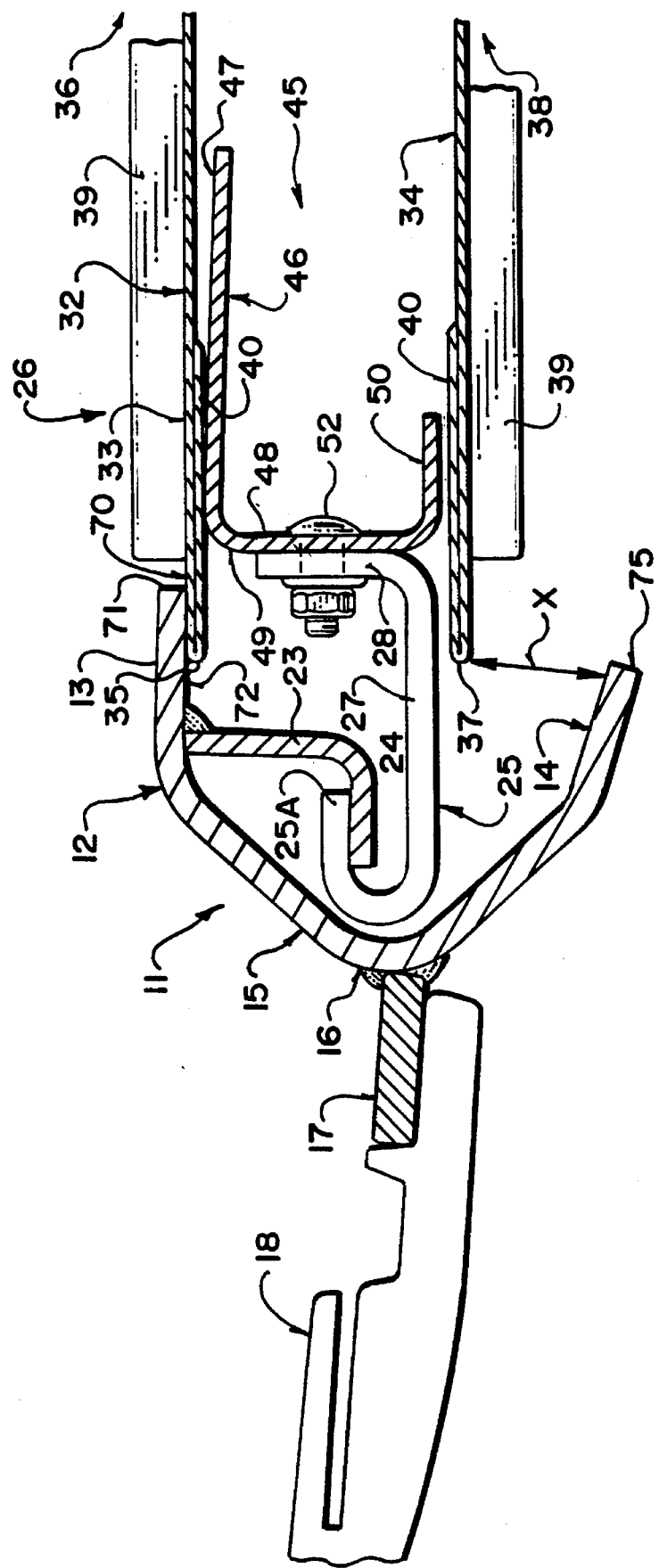
FIG. 2 is a cross sectional view along the lines 2—2 of FIG. 1.
Figure 3:
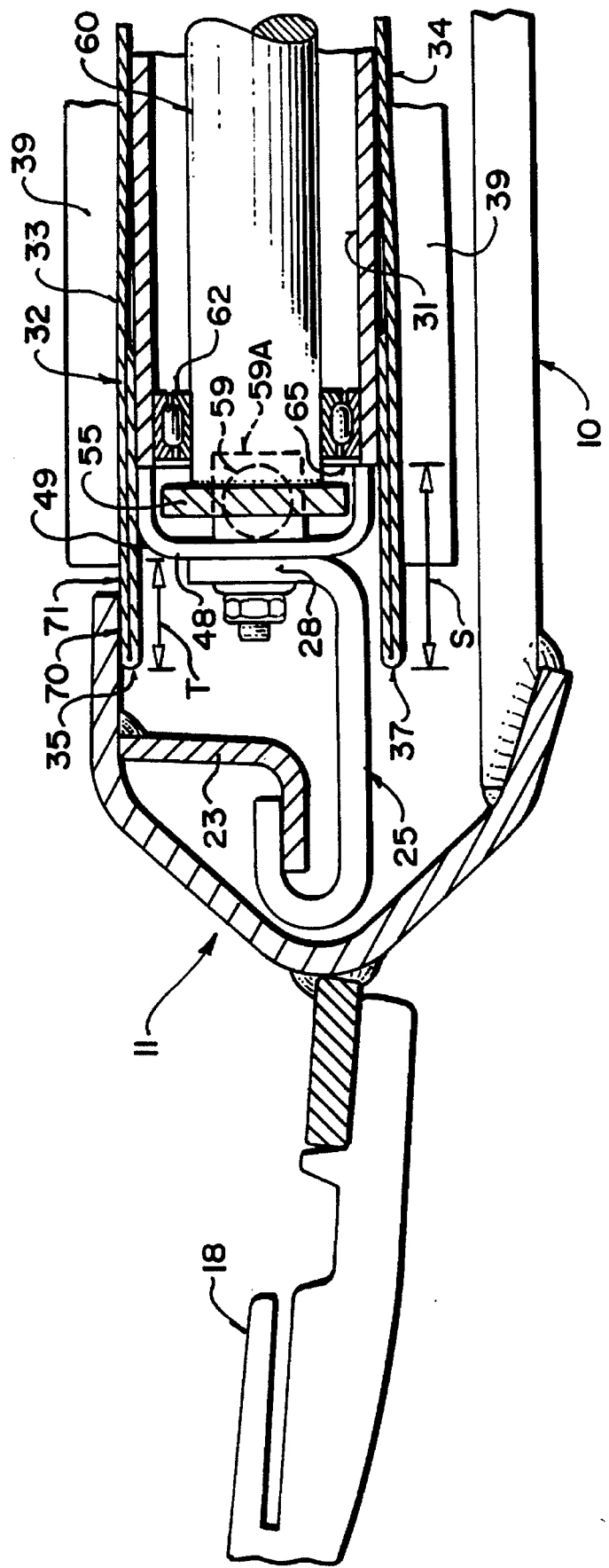
FIG. 3 is a cross sectional view along the lines 3—3 of FIG. 1.

The cutter bar comprises a generally C-shaped beam 12 which provides structural support for the cutter bar with the C-shaped beam being welded to the front ends of the forwardly extending beams 10. The C-shape beam 12 includes a top plate portion 13, a bottom plate portion 14 and a forward plate portion 15 which converges from the top and bottom plate portions toward a front apex 16 forming a forward most point of the beam 12. At the apex 16 is welded a longitudinally extending bar 17 which forms a support for a plurality of knife guards 18 only some of which are shown in FIG. 1 for convenience of illustration. The knife guards are of course of well known construction and their shape is shown only schematically. The knife guards carry a sickle knife assembly 20 having a longitudinally reciprocating bar 21 driving a plurality of triangular knife blades 22 which sit on the knife guards and reciprocate back and forth across the knife guards in a cutting action. Again this construction is well known and therefore detail is not necessary.

The cutter bar support beam 12 also carries an elongate angle iron 23 which is welded onto the top plate portion 13 on the underside thereof at the front edge thereof with the angle iron extending vertically downwardly and then forming a support plate 24 extending forwardly therefrom toward the apex 16. This angle iron thus provides a support for a bracket 25 which carries the draper assembly generally indicated at 26. The bracket 25 forms one of a plurality of such brackets spaced longitudinally of the draper assembly for hanging the draper assembly on the cutter bar. In the arrangement shown, the draper assembly 26 can thus slide longitudinally of the cutter bar as a whole integral unit for adjustment of the header to various modes of operation in which the discharge opening between two such draper assemblies is moved from one end of the header to a center section of the header. Such headers can have draper assemblies which are fixed in position relative to the cutter bar or can have draper assemblies in which one or both of the draper assemblies can slide longitudinally.

The bracket 25 thus includes a hanger portion 26 engaging over the support plate 24 and a rearwardly extending leg 27 which extends rearwardly of the cutter bar support beam 12 to a vertical leg 28 which forms the attachment to the draper assembly.

The draper assembly includes a first draper support roller 30 and the second draper support roller 31. One of these rollers is driven by a drive motor (not shown) to effect rotation of the draper in conventional manner. The draper assembly further includes a draper canvas 32 in the form of a continuous loop or band of fabric which is wrapped around the rollers 30 and 31 at respective ends to form an upper run 33 of the draper canvas on top of the rollers and a lower run 34 of the canvas underneath the rollers. The rollers are thus spaced longitudinally of the cutter bar and arranged with their axes of rotation parallel and at right angles to the cutter bar. The draper canvas thus includes a front edge 35 of the upper run which is adjacent the cutter bar and a rear edge 36 of the upper run 33 which is remote from the cutter bar and spaced rearwardly therefrom thus defining therebetween a flat surface of the upper run for transportation of the crop longitudinally of the header. The lower run 34 also includes a front edge 37 and a rear edge 38. The draper canvas can include a plurality of conventional transverse slats 39 (omitted from FIG. 1 for convenience of illustration) which assist in carrying the crop along the draper canvas. Each edge of the draper canvas can include a conventional folded seam so as to define a portion of the canvas material which is folded back as indicated at 40 with that folded back portion being bonded to the canvas by the vulcanization effect in the manufacture of the canvas.

The upper run of the draper canvas is supported by a support plate assembly generally indicated at 45 which includes a front plate 46 and includes a center plate and rear plates which are not shown for convenience of illustration. The front plate 46 includes a horizontal top plate portion 47 lying underneath the upper run of the draper canvas adjacent the front edge for supporting that front edge in sliding movement across the top surface of that plate portion 47. The support plate 46 further includes a vertical plate portion 48 which extends downwardly from a front edge 49 of the top plate portion 47. At a bottom edge of the vertical plate portion 48 is provided a lower horizontal plate portion 50 thus forming the front support plate 46 into a generally C-shape to provide structural strength so that the support plate 46 is essentially self supporting mounted on the brackets 25. Thus the vertical plate 48 of the front support 46 is bolted to the vertical leg 28 of the bracket 25 by a nut and bolt assembly 52.

The rollers 30 and 31 are carried on the support plate 46. The rollers are positioned just beyond ends 53 and 54 of the support plate 46 so that the canvas is in effect supported along its full length either by the roller or by the support plate 46. Each roller is carried upon a leg 55, 56 which is mounted inside the C-shape of the support plate 46. The leg 56 is bolted to the vertical plate 48 and extends longitudinally therefrom beyond the end 54 to a shaft 57 on which the roller 30 is carried by bearings 58. The leg 56 and the shaft 57 are fixed relative to the support member. The leg 55 is however slidable longitudinally relative to the vertical plate 48 by suitable lost motion connection and is biased outwardly of the end 53 by a spring 59 mounted on an end stop 60 within the support member. The leg 55 thus biases the roller 31 outwardly away from the end support plate to take up any stretch in the draper canvas. The leg 55 carries a shaft 60 parallel to the shaft 57 and at right angles to the leg adjacent the end of the leg with a shaft 60 again carrying the roller 31 on bearings 62. The roller 31 is an idler roller.

The length of the bracket 25 is arranged so that the front edge 49 of the support plate is spaced rearwardly by a distance T from the front edge 35 of the upper run of the draper canvas. In addition the front end 65 of the rollers 30 and 31 is spaced rearwardly from the front edge 35 of the upper run of the canvas by a distance S which is greater than the distance T. This recessing of the front edges of the support plate member and of the rollers provides a portion 70 of the front edge of the draper canvas which is cantilevered outwardly beyond the support provided by those elements.

The beam 12 of the cutter bar is shaped so that the top plate portion 13 extends rearwardly to a rear edge 71 which overlaps the portion 70. The rear edge 71 is located therefore at a position rearwardly of the front edge 35 of the draper canvas and in a position forwardly of the front edge 49 of the support plate and the front ends 65 of the draper rollers. That portion of the draper canvas therefore which engages the underside 72 of the top plate portion 13 is unsupported on its underside and is therefore free to flex downwardly should it be depressed downwardly by the presence of material collecting on the undersurface 72. The top plate portion 13 of the beam 12 is substantially horizontal that is parallel to the horizontal surface of the upper run. The cooperation therefore between the surface 72 of the upper plate portion 13 and the upper surface of the draper canvas at the portion 70 provides a seal which inhibits the tendency of materials to pass between the draper canvas and the cutter bar. This seal therefore inhibits the buildup of materials inside the C-shape of the cutter bar and between the draper canvas upper run and lower run and around the draper rollers which can of course cause damage. The seal is however not perfect since the moving parts between the draper canvas and the surface 72 allows some moisture to gradually penetrate, to carry particles into that area and this polishing or sweeping of the particles tends to form a buildup of material on the undersurface 72. This buildup of material gradually therefore pushes away the edge of the draper canvas and this can flex away without damage to the draper canvas.

The draper canvas in the vulcanization process of the conventional manufacturing technique forms a tendency of the draper canvas to curl upwardly in the upper run and of course downwardly in the lower run. This tendency to curl therefore increases the pressure of the upper surface of the draper canvas at its edge against the surface 72.

It is also found that the build-up of material on the surface 72 will naturally fall away when that material has dried for example overnight when the header is unused. There is no necessity therefore for the operator to effect a cleaning action which could of course damage the canvas edge.

The bottom plate portion 14 of the beam 12 has a rear edge 75 which is spaced forwardly from a vertical plane containing the rear edge 71 of the upper plate portion 13, that is the bottom plate portion is reduced in length. The bottom plate portion is also inclined to the horizontal so that it inclines rearwardly and downwardly. This forms a space X between the front edge 37 of the bottom run 34 and the top surface of the bottom plate portion 14. Furthermore the rear edge 75 of the bottom plate portion 14 is positioned directly beneath or slightly forwardly of the front edge 37. This spacing X and also the location of the rear edge 75 allows any materials which penetrate the seal or which are discarded by movement of the draper canvas after drying to fall from the area within the beam 12 for discharge to the ground without the possibility of collection within the draper assembly.

The device of the present invention therefore provides an arrangement which forms a seal between the draper canvas and the cutter bar to inhibit the penetration of materials and also is shaped to allow discharge of any materials which do penetrate the seal to prevent buildup. The provision of a cantilevered end section of the draper canvas is entirely different from previous draper support arrangements and enables the formation of the seal without the possibility of damage of the edge of the draper canvas by pinching between support surfaces.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A header for cutting and transporting a standing crop comprising a header frame, an elongate cutter bar arranged along a front edge of the frame and including a plurality of knife guards at spaced positions therealong and a sickle knife reciprocable longitudinally thereof within the knife guards for cutting the standing crop and a draper assembly mounted on the header frame rearwardly of the cutter bar such that crop cut by the cutter bar falls onto the draper assembly for transportation longitudinally of the header, the draper assembly including a first and a second draper guide roller each arranged at a respective end of the draper assembly spaced apart along the cutter bar with an axis of each guide roller arranged substantially at right angles to the cutter bar, a draper canvas forming a continuous loop of flexible material wrapped around the rollers so as to define an upper run of the canvas on top of the rollers and a lower run of the canvas below the rollers, a front edge of the upper run of the canvas adjacent the cutter bar, and a rear edge of the upper run of the canvas spaced rearwardly of the cutter bar, and a front draper support plate defining a substantially horizontal support surface lying under the upper run adjacent the front edge thereof and extending therealong between the first and second guide rollers, the first and second guide rollers each having a front end thereof recessed rearwardly of the front edge of the upper run of the draper canvas and the support plate having a front edge thereof recessed rearwardly of the front edge of the upper run of the draper canvas such that the upper run of the draper canvas includes a portion thereof at the front edge which is cantilevered forwardly of the rollers and of the support plate, the cutter bar including an element thereof extending rearwardly over the upper run of the draper canvas to a position rearwardly of the front edge of the upper run of the draper canvas and forwardly of the front end of the rollers and of the front edge of the support plate and engaging said portion of the draper canvas for forming a seal therewith to inhibit entry between the cutter bar and the draper canvas of materials carried by the cut crop.

2. The header according to claim 1 wherein the support plate includes a horizontal plate portion and a vertical plate portion extending vertically downwardly from a front edge of the horizontal plate portion and wherein the draper assembly includes bracket means connected to the vertical plate portion and extending forwardly therefrom into engagement with the cutter bar for supporting the draper assembly on the cutter bar.

3. The header according to claim 1 wherein the first and second guide rollers each include roller support means at a forward end thereof, each roller support means being attached to the support plate at a respective end thereof.

4. The header according to claim 1 wherein the first and second guide rollers each include roller support means at a forward end thereof, the roller support means being received wholly within an area defined by the upper and lower runs of the canvas.

5. The header according to claim 2 wherein the first and second guide rollers include roller support means at a forward end thereof, each roller support means being attached to the support plate at a respective end thereof, the support plate being generally C-shaped including said horizontal plate portion, said vertical plate portion and a second horizontal plate portion at a bottom of the vertical plate portion, wherein each roller support means includes a leg member extending from the forward end of the respective roller into the interior of the C-shaped member, a front edge of each of the rollers thus being recessed rearwardly from the front edge of the support plate.

6. The header according to claim 1 wherein the cutter bar includes a generally C-shaped support beam defining a rearwardly extending top plate portion and a generally rearwardly extending bottom plate portion, the top plate portion forming said element extending rearwardly and the bottom plate portion being spaced from a front edge of the lower run of the draper canvas so as to allow escape of materials passing between the draper canvas and the cutter bar to fall from the cutter bar to the ground.

7. The header according to claim 6 wherein the bottom plate portion of the cutter bar beam has a rear edge spaced forwardly of a rear edge of the top plate portion to allow said escape of materials.

8. The header according to claim 7 wherein the bottom plate portion is inclined downwardly and rearwardly to allow said escape of materials.

* * * * *